(12) United States Patent
Arakawa

(10) Patent No.: US 6,268,843 B1
(45) Date of Patent: *Jul. 31, 2001

(54) FLAT TYPE IMAGE DISPLAY APPARATUS

(75) Inventor: Satoshi Arakawa, Kanagawa-ken (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/103,174

(22) Filed: Aug. 6, 1993

Related U.S. Application Data

(63) Continuation of application No. 07/564,515, filed on Aug. 9, 1990, now abandoned.

(30) Foreign Application Priority Data

Aug. 10, 1989 (JP) .................................................. 1-207356

(51) Int. Cl.$^7$ ...................................................... G09G 3/34
(52) U.S. Cl. .............................................. 345/102; 345/147
(58) Field of Search ........................... 340/716, 717, 340/767, 784, 793; 358/241; 345/36, 38, 48, 50, 55, 63, 81, 102, 147; 348/801; 359/48, 84; 395/200

(56) References Cited

U.S. PATENT DOCUMENTS

| | | | |
|---|---|---|---|
| 4,155,030 | * | 5/1979 | Chang .................................. 340/760 |
| 4,170,771 | * | 10/1979 | Bly ........................................ 358/241 |
| 4,500,173 | * | 2/1985 | Leibowitz et al. .................... 350/345 |
| 4,562,433 | * | 12/1985 | Biterno ................................. 340/716 |
| 4,562,478 | * | 12/1985 | Hirasawa et al. ..................... 340/784 |
| 4,573,766 | * | 3/1986 | Bournay, Jr. et al. ................ 340/716 |
| 4,574,315 | * | 3/1986 | Yoshimura ............................ 358/241 |
| 4,578,672 | * | 3/1986 | Oota et al. ............................ 340/784 |
| 4,580,877 | * | 4/1986 | Wasko ................................... 350/345 |
| 4,611,889 | * | 9/1986 | Buzak ..................................... 359/48 |
| 4,758,818 | * | 7/1988 | Vatne ..................................... 309/48 |
| 4,760,389 | * | 7/1988 | Aoki et al. ............................ 340/784 |
| 4,766,430 | * | 8/1988 | Gillette et al. ....................... 358/241 |
| 4,833,542 | * | 5/1989 | Hara et al. ............................ 358/241 |
| 5,065,357 | * | 11/1991 | Shiraishi et al. ..................... 395/200 |
| 5,079,636 | * | 1/1992 | Brody .................................... 340/760 |
| 5,144,292 | * | 9/1992 | Shiraishi et al. ..................... 340/784 |

FOREIGN PATENT DOCUMENTS 62-76135 * 8/1987 (JP) .
371111 * 3/1991 (JP) .

* cited by examiner

Primary Examiner—Amare Mengistu
(74) Attorney, Agent, or Firm—Sughrue, Mion, Zinn, Macpeak & Seas, PLLC

(57) ABSTRACT

An image display apparatus including an active display device, which is divided into picture elements, and a passive display device, which is divided into picture elements and which is superposed upon the active display device. The image display apparatus has-a high luminance resolution and a high definition.

10 Claims, 2 Drawing Sheets

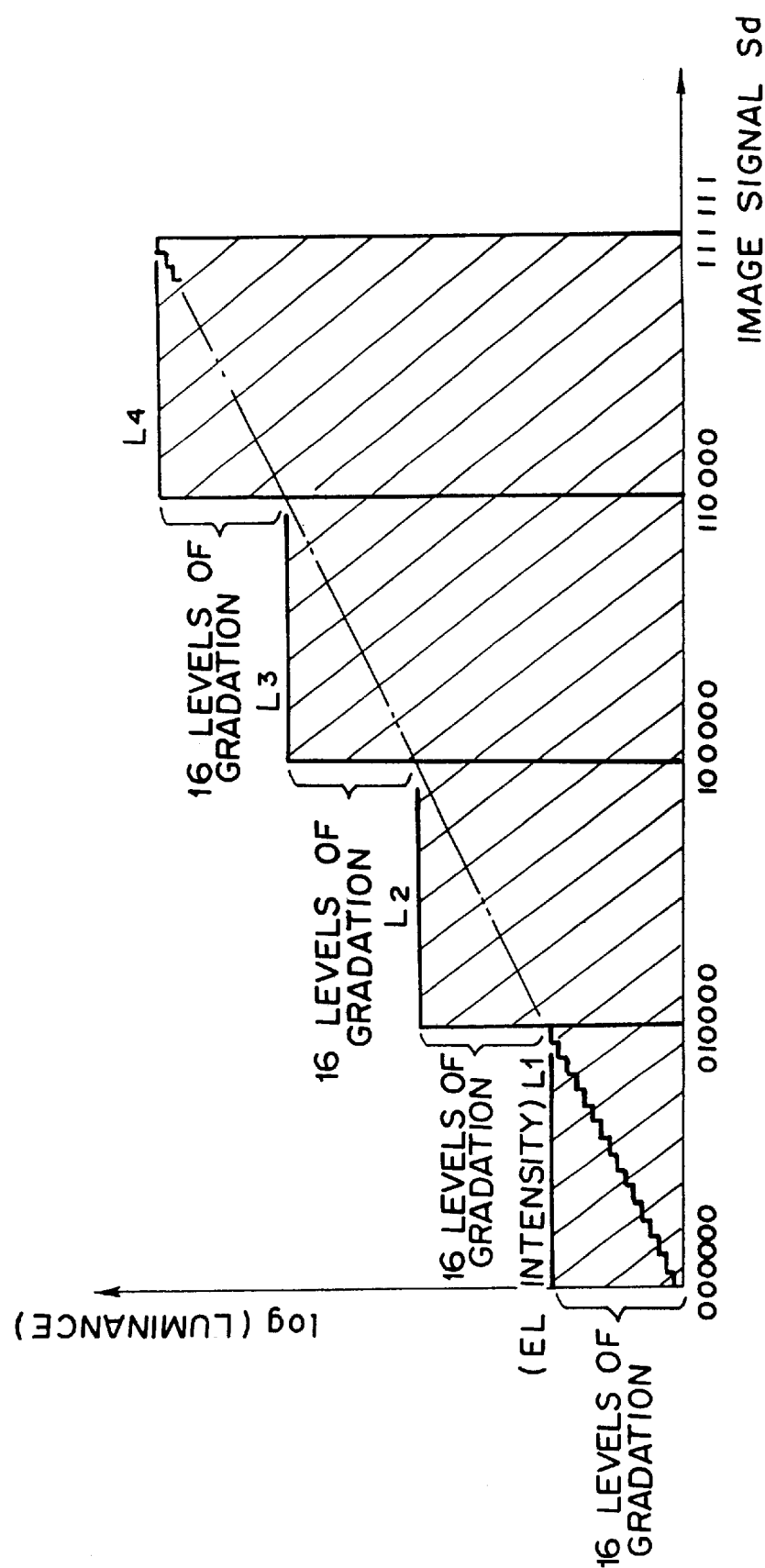

FLAT TYPE IMAGE DISPLAY APPARATUS

This is a Continuation of application Ser. No. 07/564,515 filed Aug. 9, 1990 now abandoned.

BACKGROUND OF THE INVENTION

1. Field of the Invention

This invention relates to a flat type image display apparatus. This invention particularly relates to a flat type image display apparatus which has a high luminance resolution and a high definition.

2. Description of the Related Art

CRT display devices have heretofore been known as a means for displaying images. The CRT display devices have a high luminance resolution and a high definition, i.e. fine resolution of picture elements, and therefore have heretofore been used widely. However, the CRT display devices have the drawback in that they are large and heavy.

Therefore, recently, flat type image display devices, such as a liquid crystal display device (LCD), a plasma display panel (PDP), and an electrochromic display device (ECD), have been utilized in some fields of application.

However, none of the conventional flat type image display devices simultaneously satisfy the requirements with regard to a high luminance resolution and a high definition. For example, an LCD and an ECD have a comparatively high definition, but have a markedly lower luminance resolution than a CRT display device. By way of example, the luminance resolution of an LCD or an ECD is 16 levels of gradation. Also, a PDP has a lower luminance resolution and a lower definition than a CRT display device.

SUMMARY OF THE INVENTION

The primary object of the present invention is to provide a flat type image display apparatus which has a high luminance resolution and a high definition.

Another object of the present invention is to provide a flat type image display apparatus which displays an image having very good image quality.

The present invention provides a flat type image display apparatus comprising an active display device, which is divided into picture elements, and a passive display device, which is divided into picture elements and which is superposed upon the active display device.

An LCD or an ECD may be utilized as the passive display device. As described above, such a passive display device has a comparatively high definition and a comparatively low luminance resolution. With the flat type image display apparatus in accordance with the present invention, the active display device is located at the rear of the passive display device. Therefore, the luminance resolution can be increased synergistically. Specifically, when a passive display device having, for example, 16 levels of gradation is combined with an active display device having four levels of gradation, the total number of levels of gradation of the flat type image display apparatus becomes equal to 16×4=64.

It is desirable that an active display device having the same number of picture elements as the passive display device be utilized. However, it is difficult to obtain such an active display device. Therefore, an active display device having a smaller number of picture elements than the passive display device be utilized. In such cases, a plurality of adjacent picture elements of the passive display device are exposed to an equal amount of light emitted by a single picture element (a single light emitting element) of the active display device. However, in the case of an ordinary image, the difference in image density between the adjacent picture elements is very small. Therefore, even when a plurality of adjacent picture elements of the passive display device are exposed to an equal amount of light, the gradation reproducibility does not deteriorate to such an extent that the gradation become imperceptible.

Accordingly, an active display device should preferably be utilized which is suitable primarily for improving the luminance resolution. Specifically, an active display device having more levels of gradation should preferably be utilized. The number of picture elements of the active display device may be smaller than that of the passive display device. By way of example, an electroluminescence panel (EL panel), a PDP, or a light emitting diode panel (LED panel) is suitable as the active display device.

As described above, with the flat type image display apparatus in accordance with the present invention, the passive display device, which is comparatively easy to increase the density of picture elements, is superposed upon the active display device. Therefore, the flat type image display apparatus in accordance with the present invention has a high definition and a high luminance resolution. Accordingly, with the flat type image display apparatus in accordance with the present invention, an image having a very good image quality can be displayed. Also, because the flat type image display apparatus in accordance with the present invention is thin in thickness and light in weight, it is applicable in various fields.

BRIEF DESCRIPTION OF THE DRAWINGS

FIG. 3 is an explanatory graph showing the luminance resolution of the embodiment shown in FIGS. 1 and 2.

DESCRIPTION OF THE PREFERRED EMBODIMENTS

The present invention will hereinbelow be described in further detail with reference to the accompanying drawings.

Figure 1:
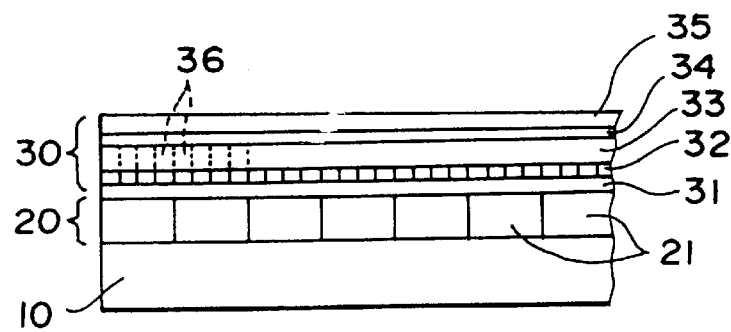
FIGS. 1 and 2 are a side view and a plan view showing an embodiment of the flat type image display apparatus in accordance with the present invention.
Figure 2:
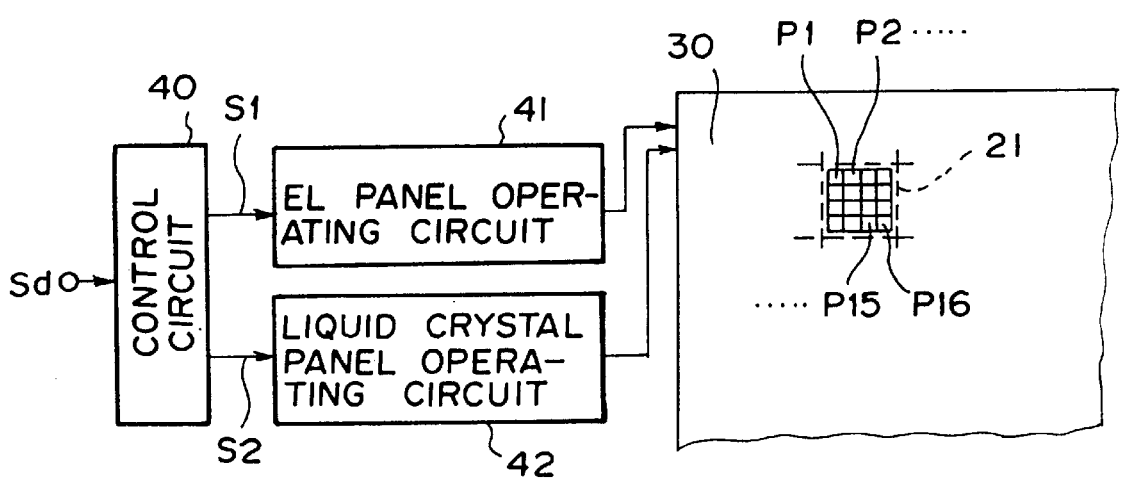

FIGS. 1 and 2 are a side view and a plan view showing an embodiment of the flat type image display apparatus in accordance with the present invention. The flat type image display apparatus comprises a flat plate-like substrate 10, an electroluminescence panel (EL panel) 20, which serves as an active display device and which is secured to the substrate 10, and a liquid crystal panel 30, which serves as a transmission type passive display device and which is secured to the EL panel 20. The EL panel 20 comprises a plurality of EL elements 21, 21, . . . , which are located in the matrix form. Each of the EL elements 21 constitutes a single picture element. By way of example, the liquid crystal panel 30 is of the thin-film transistor (TFT) switch matrix laminate type. The liquid crystal panel 30 of this type comprises a glass plate 31, a TFT switch matrix 32, a liquid crystal layer 33, a common transparent electrode 34, and a glass plate 35, which are stacked in this order from the side of the EL panel 20. The part of the liquid crystal layer 33, which is located between one of the picture element electrodes of the switch matrix 32 and the common transparent electrode 34 constitutes a single liquid crystal cell 36, which serves as a single picture element.

In this embodiment, the size of each picture element of the liquid crystal panel 30, i.e. the size of each liquid crystal cell 36, is approximately 250×250 µm. The size of each picture element of the EL panel 20, i.e. the size of each EL element 21, is approximately 1×1 mm. Therefore, sixteen (i.e. 4×4) liquid crystal cells 36, 36, . . . face each EL element 21.

A control circuit 40 of the flat type image display apparatus receives a digital image signal Sd and generates an EL panel control signal S1 and a liquid crystal control signal S2 in accordance with the digital image signal Sd. The EL panel control signal S1 and the liquid crystal panel control signal S2 are fed respectively into an EL panel operating circuit 41 and a liquid crystal panel operating circuit 42. The EL panel 20 and the liquid crystal panel 30 are respectively operated by the EL panel control signal S1 and the liquid crystal panel control signal S2. The image signal Sd takes 64 values ranging from "000000" representing the minimum luminance (maximum image density) to "111111" representing the maximum luminance (minimum image density). The image signal Sd corresponds to the number of picture elements of the liquid crystal panel 30. The liquid crystal panel control signal S2 controls the light transmittances of the liquid crystal cells 36, 36, . . . of the liquid crystal panel 30 independently of one another. Therefore, an image displayed, each of the liquid crystal cells 36, 36, . . . constitutes a single picture element of an image displayed on the flat type image display apparatus. The light transmittance of each liquid crystal cell 36 can be controlled such that it takes one of 16 levels. The liquid crystal panel control signal S2 controls the light transmittance of each liquid crystal cell 36 such that it takes one of 16 levels in accordance with the value of the four least significant digits of the image signal Sd, which value ranges from "0000" to "1111".

As shown in FIG. 2, the EL panel control signal S1 designates the value of each EL element 21 in accordance with the representative value (e.g. the median value, or the mean value) of the values of the image signal Sd corresponding to sixteen picture elements P1 through P16, which face the EL element 21. Each EL element 21 is capable of emitting light having one of intensities L1, L2, L3, and L4 (L1<L2<L3<L4). The EL panel control signal S1 activates each EL element 21 to emit light having the intensities L1, L2, L3, and L4 respectively when the value of the most significant digits of the representative value (which is constituted of eight digits) is "00", "01", "10", and "11".

FIG. 3 shows the relationship between the luminance of each picture element and the value of the image signal Sd when the EL panel 20 and the liquid crystal panel 30 are operated respectively in accordance with the EL panel control signal S1 and the liquid crystal panel control signal S2. As illustrated, the intensity of back light emitted by each EL element 21 is controlled such that it takes one of the levels L1, L2, L3, and L4. Also, at each level of the intensity of back light, the light transmittance of each liquid crystal cell 36 is controlled such that it takes one of 16 levels. Therefore, the flat type image display apparatus has a total of 64 (i.e. 4×16) levels of gradation.

In the embodiment described above, the EL panel 20 is employed as the active display device, and the liquid crystal panel 30 is employed as the passive display device. However, in the flat type image display apparatus in accordance with the present invention, the active display device and the passive display device may be selected from various other types of devices. Also, in the aforesaid embodiment, the ratio of the number of picture elements of the active display device to the number of picture elements of the passive display device is 1:16. However, the ratio of the number of picture elements of the active display device to the number of picture elements of the passive display device may be set to any of other values, including 1:1.

What is claimed is:

1. A flat type display apparatus comprising:
   a substrate;
   an active display device, on said substrate, having a plurality of picture elements arranged in a two dimensional matrix form, wherein each of the plurality of picture elements of said active display device emits a back light having a light intensity with a plurality of levels of gradation;
   a transmission type passive display device, superposed on said active display device, having a plurality of picture elements arranged in a two dimensional matrix form, wherein each of the plurality of picture elements of said transmission type passive display device has a light transmittance; and
   a control circuit receiving an image signal and based on a first portion of the image signal independently controlling the light transmittance of each of the picture elements of said transmission type passive display device so as to cause each of the picture elements to assume one of a plurality of gradation levels and based on a second portion of the image signal independently controlling the light intensity of each of the picture elements of said active display device so as to take on one of a plurality of intensities thereby increasing the dynamic range of gradation levels of the passive display device,
   wherein said passive display device is divided into picture elements of a finer resolution than said active display device.

2. An apparatus as defined in claim 1 wherein said passive display device is selected from the group consisting of a liquid crystal display device and an electrochromic display device.

3. An apparatus as defined in claim 1 wherein said active display device is selected from the group consisting of an electroluminescence panel, a plasma display panel, and a light emitting diode panel.

4. An apparatus as defined in claim 1 wherein said active display device is controlled so as to improve luminance resolution of said apparatus.

5. An apparatus as defined in claim 1 wherein said active display device comprises an electroluminescence panel, and said transmission type passive display device comprises a liquid crystal panel.

6. An apparatus as defined in claim 1 wherein the number of picture elements of said active display device and the number of picture elements of said transmission type passive display device are equal.

7. An apparatus as defined in claim 1 wherein in response to said control circuit receiving the image signal said control circuit produces, based on the first portion of the image signal, a first control signal for controlling the light transmittance of each of the picture elements of said transmission type passive display device superposed on one of the picture elements of said active display device, and produces, based on the second portion of the image signal, a second control signal for controlling the light intensity of said one of the picture elements of said active display device.

8. An apparatus as defined in claim 1, wherein the control circuit independently controls the light intensity of a picture element of said active display device based on a representative value of the second portion of the image signals corresponding to picture elements of said passive display device superposed on the picture element of said active display device.

9. An apparatus as defined in claim 8, wherein the representative value is a median value of the second portion of the image signals corresponding to picture elements of said passive display device superposed on the picture element of said active display device.

10. An apparatus as defined in claim 8, wherein the representative value is a mean value of the second portion of the image signals corresponding to picture elements of said passive display device superposed on the picture element of said active display device.

* * * * *